Sept. 7, 1937.   C. U. GRAMELSPACHER   2,092,697
WATERPROOF WOODEN RECEPTACLE
Filed May 25, 1936
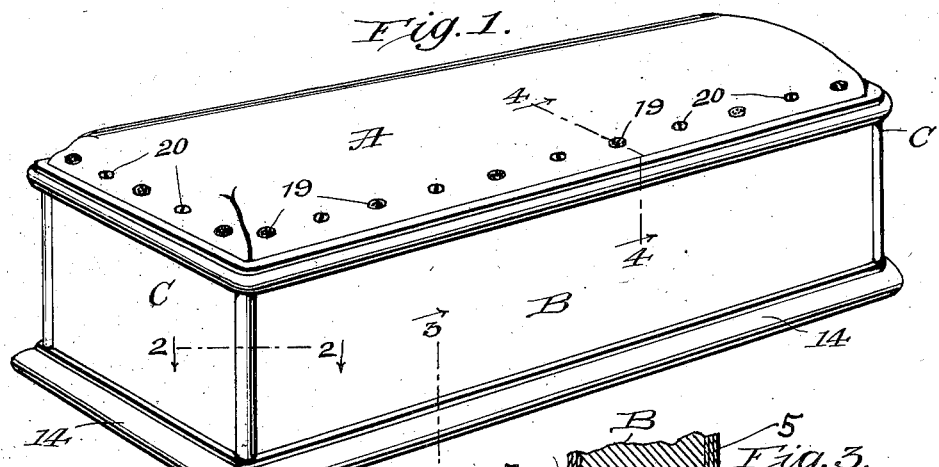
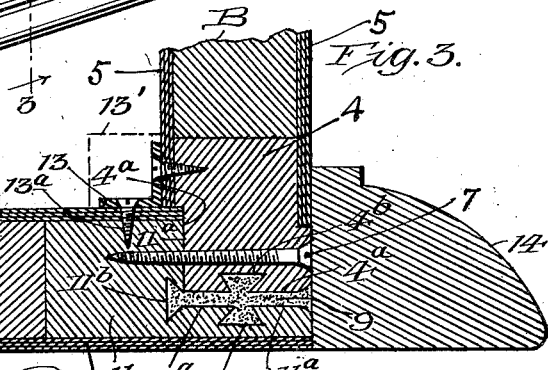
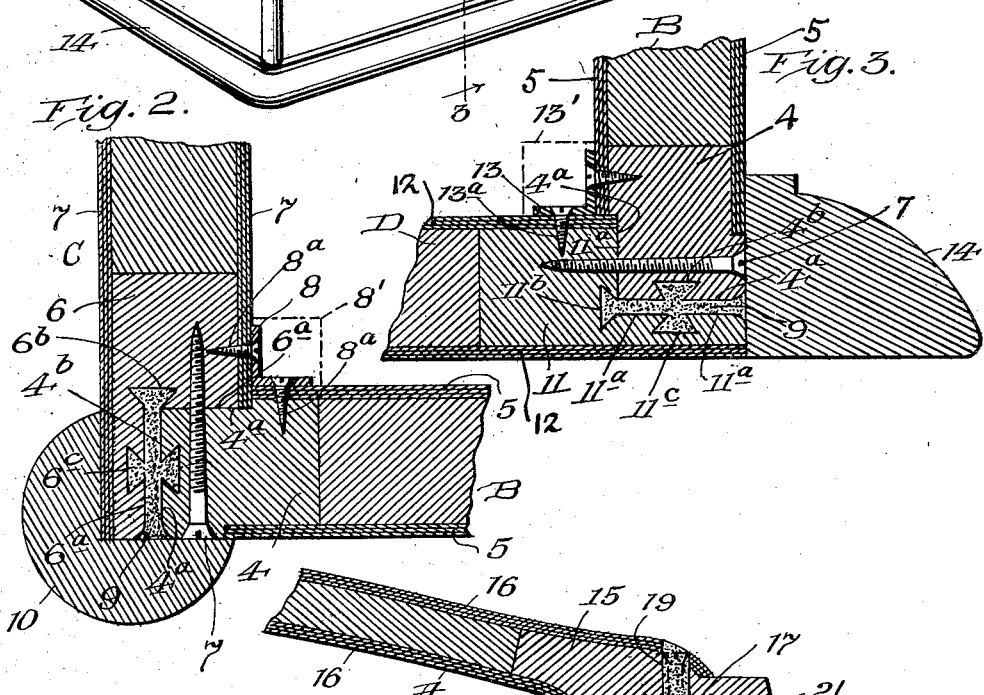

Patented Sept. 7, 1937

REISSUED
AUG -6 1940

2,092,697

UNITED STATES PATENT OFFICE 2,092,697

WATERPROOF WOODEN RECEPTACLE

Clarence U. Gramelspacher, Jasper, Ind.

Application May 25, 1936, Serial No. 81,756

14 Claims. (Cl. 27—2)

This invention is a novel waterproof, vermin-proof, and decay-resisting wooden receptacle which may be used for various purposes, particularly as a burial vault or casket, and the principal object of the invention is to provide a wooden receptacle of the above type in which all of the walls are formed of pre-fabricated members, each consisting of an open frame covered on both faces with plywood panels of decay-resisting wood, the frame and panels being secured together by means of waterproof fungus-resisting glue, and the spaces between the panels being filled with solid material glued to form a solid panel, or filled with an inert material coated or impregnated with poison or some repellant to render same vermin-proof, the meeting edges of the members secured together by a novel waterproof joint; and the entire receptacle having a waterproof finish coating on its exterior.

I will explain the invention with reference to the accompanying drawing which illustrates one practical embodiment thereof to enable others to adopt and use the same, and will summarize in the claims the novel features of the construction, and novel combinations of parts, for which protection is desired.

In the said drawing:

Fig. 1 is a perspective view of one form of my receptacle.

Fig. 2 is an enlarged section on the line 2—2, Fig. 1.

Fig. 3 is an enlarged section on the line 3—3, Fig. 1; and

Fig. 4 is an enlarged section on the line 4—4, Fig. 1.

My novel receptacle is preferably of general rectangular shape and comprises a top member A, side members B, end members C, and a bottom member D, each of said members being pre-fabricated and joined together at their meeting edges as hereinafter described.

Each side member B comprises a skeleton or open frame of rectangular shape formed of wooden members 4 (Fig. 2) which frame is covered on both faces with panels of decay-resisting plywood 5, the plywood layers being secured together and to the members 4 by means of waterproof fungus-resisting glue. The space between the plywood panels 5—5 is filled or packed with an inert vegetable or mineral material in solid or loose form which material is preferably coated or impregnated with poison to render same vermin-proof.

Each end member C of the receptacle similarly consists of a skeleton or open rectangular frame formed of wooden members 6 (Fig. 2), said frame being covered on both faces with panels of decay-resisting plywood 7, the plywood layers 7 being secured together and to the frame members 6 by means of waterproof fungus-resisting glue. The space between the plywood panels 7—7 is likewise filled or packed with an inert vegetable or mineral material impregnated or coated with poison, to render same vermin-proof.

The bottom member D similarly consists of an open frame formed of members 11, the frame being covered on both faces with plywood panels 12—12 (Fig. 3), the member being in all respects formed similarly to members B and C; and the top member A of the receptacle is preferably somewhat arched as indicated in Figs. 1 and 4, but is otherwise formed in a manner similar to the members B, C, and D, the frame members 15 of the top preferably covered on both faces with panels 16—16 of decay-resisting plywood in the manner previously described, utilizing water-proof fungus-resisting glue. The space between the plywood panels 16—16 is likewise filled with inert vegetable or mineral material coated or impregnated with poison.

The vertical meeting edges of the sides B and ends C are joined together as shown in Fig. 2, in which the inner face of the frame member 6 of the end member C is recessed as at 6a a distance slightly less than the thickness of the side member B. At the heel of recess 6a is an undercut or dovetailed recess 6b and in the wall of the recess opposite the end of the side member B is a second undercut or dovetailed recess 6c. The inner face of the frame of side member B is recessed as at 4a forming a shoulder extending from the end of the side member B adapted to enter the recess 6a and abut squarely against the inner wall thereof, said shoulder being of length less than the depth of recess 6a so as to leave a packing space as shown in Fig. 2. In the outer edge of the side member B opposite the undercut or dovetailed recess 6c is a similarly shaped undercut recess 4b.

In assembling the side and end members B and C the pre-fabricated and recessed members are initially held in the position shown in Fig. 2 by means of nails or screws 7 passing through the frame member 4 into the member 6. Then angle irons 8 (or wooden corner blocks 8' shown in dotted lines in Fig. 2) are fitted to the inner corners formed between the members B and C and secured by screws 8a or the like to the frame members 4 and 6 respectively. A packing 9, preferably of water-resisting material such as tar, pitch, resin, or other waterproofing material, is then forced as shown in Fig. 2 into the above-mentioned recesses formed between the frame members 4 and 6, said packing completely filling the recesses and entering and being locked in place by the undercut or dovetailed recesses 6b, 6c, and 4b. By the above construction the joint between the side and end members is such that the interfitted members contact squarely along the inner portion of the line of juncture while providing a dovetailed recess between the members along the outer portion of the line of juncture for receiving the filling 9.

If desired, in order to give a neat finish to the exterior vertical corners of the receptacle, circular or other shaped moldings 10 may be applied over the packing 9 and screws 7 as shown in Figs. 1 and 2; however the moldings 10 may be omitted where the ornamental effect is not necessary or wanted.

A similar joint is formed between the bottom member D and the lower ends of the side and end members B and C of the receptacle, the lower inner edges of the frame members 4 and 6 of the side and end members B and C being recessed as at 4a (Fig. 3) in a manner similar to that shown in Fig. 2, and the lower ends of the frame members 4 and 6 being further provided with undercut or dovetailed recesses 4b similarly to that shown in Fig. 2. The outer edges of the frame members 11 of the bottom D are provided with the recesses 11a (similar to the recess 6a of Fig. 2) which are further provided with undercut or dovetailed recesses 11b and 11c (similar to the undercut or dovetailed recesses 6b and 6c of Fig. 2).

In assembling the bottom, sides and ends the pre-fabricated and grooved members B, C, and D are initially held together by means of nails or screws 7 passing through members 4 (or 6) into members 11, as shown in Fig. 3, and subsequently angle irons 13 (or wooden corner blocks 13' shown in dotted lines in Fig. 3) are positioned at the inner corners formed by the members B (or C) and D, and secured to the frame members 4 (or 6) and 11 by means of nails, screws, or the like 13a, whereupon the packing space between the members 4 (or 6) and 11 would be packed and filled with water-resisting material 9, the material filling the undercut or dovetailed recesses 4b, 11b, 11c all in the manner previously disclosed with respect to the corresponding recess of Fig. 2.

If desired, a molding 14 may be applied around the bottom of the receptacle over the packing 9 and screws 7 to give a finished appearance thereto, although the molding may be omitted where such ornamental effect is not wanted.

The connection between the top member A and the upper ends of the sides and ends B and C is as follows: In the bottom face of frame member 15 of the top A is a continuous stepped or dovetailed recess 17 (Fig. 4) conforming with similarly shaped stepped or dovetailed recesses 18 in the tops of the side and end members B and C of the receptacle, the two complementary recesses 17 and 18 forming a channel for receiving the packing material. At spaced intervals around the top A are bores 19 (Figs. 1 and 4) registering with the center of the recess 17.

In assembling the top A would be set in place upon the side and end members B and C, and screws 20 (Figs. 1 and 4) applied through the frame members 15 into the tops of the side and end members of the receptacle, the screws 20 being disposed between the bores 19 as clearly indicated in Fig. 1. After the top has been thus secured, packing material 21 (similar to packing 9 used between the sides, ends, and bottom of the receptacle) would be forced down through the spaced bores 19 in the top A to completely fill the channel formed by the complementary recesses 17 and 18, the filling material 21 preferably completely filling the bores 19 and terminating flush with the upper surface of top A so as to assist in draining water or moisture from the top of the receptacle.

The entire receptacle is preferably finished on the outside (or on both outside and inside) with a waterproof coating such as lacquer or varnish; but if desired the finish coating may comprise or include the same waterproof fungus-resisting glue previously described as used in the formation of the panels in order to increase the waterproof quality of the receptacle.

The receptacle is inexpensive to manufacture, durable, water-proof, decay-resisting, and vermin-proof, and therefore the same is particularly adapted for use as a burial vault or casket but obviously may have various other applications or uses.

I claim:—

1. A waterproof receptacle, comprising prefabricated waterproof top, bottom, side and end members; the meeting edges of the side, end, and bottom members being interfitted so that the members contact squarely along the inner portion of the line of juncture while providing a continuous space between the members along the outer portion of the line of juncture; waterproof packing filling the space; means for securing the side, end, and bottom members together; means for securing the top member upon the side and end members; and means for waterproofing the joint between the top and side and end members.

2. In a receptacle as set forth in claim 1, the inner face of one interfitting member having a recess extending inwardly from its side edge receiving a shoulder on the end of the other interfitting member which contacts the inner portion of the recess; the length of the shoulder being less than the depth of the recess.

3. In a receptacle as set forth in claim 1, the inner face of one interfitting member having a rectangular recess extending inwardly from its side edge receiving a shoulder on the end of the other interfitting member which contacts the inner wall of the recess; the length of the shoulder being less than the depth of the recess thereby providing the said packing space; and means in the walls bounding the said packing space for retaining the packing therein.

4. In a receptacle as set forth in claim 1, the inner face of one interfitting member having a rectangular recess extending inwardly from its side edge receiving a shoulder on the end of the other interfitting member which contacts the inner wall of the recess; the length of the shoulder being less than the depth of the recess thereby providing the said packing space; and dovetailed recesses in the walls bounding the said packing space for retaining the packing therein.

5. In a receptacle as set forth in claim 1, said top having a continuous recess in its underside conforming with opposed recesses in the upper ends of the side and end members; spaced bores extending through the top and registering with the recess therein; and said waterproofing means for the top comprising packing material forced into the bores and filling the channel formed between the recesses in the top, side, and end members.

6. In a receptacle as set forth in claim 1, said top having a continuous recess in its underside conforming with opposed recesses in the upper ends of the side and end members; spaced bores extending through the top and registering with the recess therein; said top securing means comprising a series of fastenings passing through the top and end members between the bores; and said waterproofing means for the top comprising packing material forced into the bores and filling the channel formed between the recesses in the top, side, and end members.

7. A waterproof receptacle comprising prefabricated waterproof top, bottom, side and end members, each consisting of a skeleton frame covered on both faces with panels; the meeting edges of the side, end, and bottom members being interfitted so that the members contact squarely along the inner portion of the line of juncture while providing a continuous space between the members along the outer portion of the line of juncture; waterproof packing filling the space; means for securing the side, end, and bottom members together; means for securing the top member upon the side and end members; and means for waterproofing the joint between the top and side and end members.

8. A waterproof receptacle, comprising prefabricated waterproof top, bottom, side and end members, each consisting of a skeleton frame covered on both faces with plywood panels; filling material in the space between the panels of each frame; the meeting edges of the side, end, and bottom members being interfitted so that the members contact squarely along the inner portion of the line of juncture while providing a continuous space between the members along the outer portion of the line of juncture; waterproof packing filling the space; means for securing the side, end, and bottom members together; means for securing the top member upon the side and end members; and means for waterproofing the joint between the top and side and end members.

9. In a receptacle as set forth in claim 8, said inert filling material being impregnated with a vermin-repelling medium.

10. In a receptacle as set forth in claim 8, the layers of plywood being decay-resisting, and secured together and to their frames with waterproof fungus-resisting glue.

11. A waterproof receptacle, comprising prefabricated waterproof top, bottom, side and end members; the meeting edges of the side, end, and bottom members being connected together to form a waterproof joint; said top having a continuous recess in its underside conforming with opposed recesses in the upper ends of the side and end members; spaced bores extending through the top and registering with the recess therein; means for securing the top member to the side and end members, and waterproofing means for the top comprising packing material forced into the bores and filling the channel formed between the recesses in the top, side, and end members.

12. In a receptacle as set forth in claim 11, said top securing means comprising a series of fastenings passing through the top and end members between the bores in the top.

13. A waterproof receptacle, comprising prefabricated waterproof top, bottom, side and end members, each consisting of a skeleton frame covered on both faces with panels, the panels being decay-resisting, and secured to their frames with waterproof fungus-resisting glue; inert filling material in the space between the panels of each frame; the meeting edges of the top, side, end, and bottom members being connected together; and means for waterproofing the joints between the top, side, end and bottom members.

14. A waterproof receptacle, comprising prefabricated waterproof top, bottom, side and end members, each consisting of a skeleton frame covered on both faces with plywood panels, the plywood layers being decay-resisting, and secured together and to their frames with waterproof fungus-resisting glue; inert filling material in the space between the panels of each frame, said filling material being impregnated with vermin-repelling medium; and the meeting edges of the top, side, end and bottom members being connected together; and means for waterproofing the joints between the top, side, end, and bottom members.

CLARENCE U. GRAMELSPACHER.